US010752062B2

(12) United States Patent
Rode et al.

(10) Patent No.: US 10,752,062 B2
(45) Date of Patent: Aug. 25, 2020

(54) SYSTEM FOR INDIRECTLY MONITORING THE INFLATION PRESSURE OF PNEUMATIC-TYRED VEHICLE WHEELS AND VEHICLE WHEEL THEREFORE

(71) Applicant: Hayes Lemmerz Holding GmbH, Konigswinter (DE)

(72) Inventors: Karl Rode, Konigswinter (DE); Uwe Gohrbandt, Haan (DE); Volker Weber, Erpel (DE)

(73) Assignee: Hayes Lemmerz Holding GmbH, Konigswinter (DE)

( * ) Notice: Subject to any disclaimer, the term of this patent is extended or adjusted under 35 U.S.C. 154(b) by 0 days.

(21) Appl. No.: 15/027,871

(22) PCT Filed: Oct. 2, 2014

(86) PCT No.: PCT/IB2014/065020
§ 371 (c)(1),
(2) Date: Apr. 7, 2016

(87) PCT Pub. No.: WO2015/052623
PCT Pub. Date: Apr. 16, 2015

(65) Prior Publication Data
US 2016/0250903 A1 Sep. 1, 2016

(30) Foreign Application Priority Data

Oct. 7, 2013 (DE) .................... 20 2013 104 533 U

(51) Int. Cl.
*B60C 23/06* (2006.01)
*B60C 23/00* (2006.01)

(52) U.S. Cl.
CPC ............ *B60C 23/06* (2013.01); *B60C 23/004* (2013.01); *B60C 23/064* (2013.01)

(58) Field of Classification Search
None
See application file for complete search history.

(56) References Cited

U.S. PATENT DOCUMENTS 3,881,170 A * 4/1975 Hosaka ................. B60C 23/043
340/448
4,966,034 A * 10/1990 Bock .................. B60C 23/0408
73/146.5
(Continued)

FOREIGN PATENT DOCUMENTS

DE 10001272 A1 7/2001
DE 10146031 A1 4/2003

OTHER PUBLICATIONS

PCT International Search Report, Application No. PCT/IB2014/065020, dated Dec. 19, 2014.

*Primary Examiner* — Jill E Culler
(74) *Attorney, Agent, or Firm* — MacMillan, Sobanski & Todd, LLC

(57) ABSTRACT

A system for indirectly monitoring the inflation pressure of pneumatic-tyred vehicle wheels, and also to a wheel. The wheel is having a wheel body with a rim part and a disc part, and a tyre detachably fitted on the rim part of the wheel body. The wheel comprises at least one deformation sensor for sensing the tyre inflation pressure at the time, and the system comprises a data transmission device for transmitting sensor signals of the at least one sensor to an evaluation device, and an evaluation device for evaluating the sensor signals. In order to provide a system and vehicle wheels that are simplified in comparison with the tyre pressure monitoring system previously used, the deformation sensor is fitted on the wheel body and is usable or used for sensing inflation-pressure-dependent deformations of the wheel body.

17 Claims, 3 Drawing Sheets

(56) References Cited

U.S. PATENT DOCUMENTS

| | | | |
|---|---|---|---|
| 5,163,320 A | | 11/1992 | Goshima et al. |
| 5,546,070 A | * | 8/1996 | Ellmann ............. B60C 23/0411 |
| | | | 340/442 |
| 5,749,984 A | * | 5/1998 | Frey ...................... B60C 23/064 |
| | | | 152/152.1 |
| 6,959,593 B2 | * | 11/2005 | Mancosu ............ B60C 23/0411 |
| | | | 340/445 |
| 7,409,273 B2 | * | 8/2008 | Ishikawa ................. B60C 23/06 |
| | | | 701/33.9 |
| 7,444,858 B2 | * | 11/2008 | Bickel ................... B60C 23/064 |
| | | | 73/146 |
| 8,661,885 B1 | * | 3/2014 | Singh .................. B60C 23/0408 |
| | | | 701/1 |
| 2013/0299007 A1 | * | 11/2013 | Faretra ................. B60C 23/064 |
| | | | 137/227 |

* cited by examiner

SYSTEM FOR INDIRECTLY MONITORING THE INFLATION PRESSURE OF PNEUMATIC-TYRED VEHICLE WHEELS AND VEHICLE WHEEL THEREFORE

CROSS-REFERENCE TO RELATED APPLICATIONS

This application is a national stage of International Application No. PCT/IB2014/065020 filed Oct. 2, 2014, the disclosures of which are incorporated herein by reference in entirety, and which claimed priority to German Patent Application No. 20 2013 104 533.0 filed Oct. 7, 2013, the disclosures of which are incorporated herein by reference in entirety.

BACKGROUND OF THE INVENTION

The invention relates to a system for indirectly monitoring the inflation pressure of a pneumatic-tyred vehicle wheel on vehicles, comprising at least one wheel body with a rim part and a disc part, comprising a tyre detachably fitted on the rim part of the wheel body, comprising a valve fitted in the wheel body and intended for changing the inflation pressure in the tyre, comprising at least one sensor for sensing the tyre inflation pressure at the time, comprising a data transmission device for transmitting sensor signals of the at least one sensor to an evaluation device, and comprising an evaluation device for evaluating the sensor signals, the at least one sensor being a deformation sensor. The invention also relates to a vehicle wheel for such a system comprising a wheel body, which has a disc part that can be fastened to a vehicle axle of a vehicle and a rim part for receiving a tyre, the wheel body being provided with a valve hole for fitting a valve for optionally changing an inflation pressure in the fitted tyre.

It has been known for years in the vehicle industry that the tyre pressure of a pneumatic-tyred vehicle wheel has a not inconsiderable influence on the safe operation of a vehicle. Not only does an incorrect tyre pressure lead to increased fuel consumption, and to this extent to inefficient operation of the vehicle, but also an inappropriate tyre pressure can cause considerable safety problems that can lead to accidents. In order to make it easier for the vehicle driver to monitor the tyre pressure, tyre pressure monitoring systems have therefore been designed for numerous vehicles, operating with the electronic system and signal indicating instruments of a vehicle to allow the tyre pressure to be indicated.

Most of the tyre pressure monitoring systems (TPMS) available on the market use for this purpose directly measuring pressure sensors that are assigned to the valve and transmit the tyre pressure value measured by the pressure sensor by way of an electronic system of the wheel equipped with a transmission antenna to a receiving device in the vehicle, which then in turn indicates the measured value by way of the electronic system of the vehicle and, if it is below a prescribed value, possibly triggers a warning signal. The directly measuring tyre pressure monitoring systems use relatively expensive and heavy sensors along with wheel electronics, which in each case leads to an imbalance in the vehicle wheel, which in turn has to be compensated by way of balancing weights. When a vehicle wheel is changed, there is an increased risk of damage to the inflation pressure sensor and/or the wheel electronics. Although directly measuring tyre pressure monitoring systems are most widely used, in spite of the weight of sometimes over 40 g for the measuring sensor along with the wheel electronics, they are overall technically disadvantageous for the operation of vehicles with vehicle wheels.

In the case of the directly measuring tyre pressure monitoring systems, leakage problems can occur, in particular in the case of high-speed vehicle wheels, for example on account of the centrifugal forces. Changed wheel geometries with minimal well depths or narrow well widths may also lead to problems in the fitting of valves equipped with directly measuring sensors. In the case of vehicle wheels that are to be equipped by the wheel manufacturer with directly measuring valves suitable for tyre pressure monitoring, the mounting and/or further processing of the vehicle wheels may lead to damage to the valves unless corresponding measures are taken to protect these valves, thereby increasing the handling effort involved.

In the case of military vehicles, it has been known for over 10 years to provide a rotary inflation pressure connection between the interior space in the tyre and a pressure controller in the vehicle, by way of which it is possible for the tyre pressure to be measured and changed while under way. These control systems are still more complex and expensive than the previously mentioned directly measuring tyre pressure monitoring systems, and therefore have not so far gained access to the market in the area of civilian passenger vehicles and in the area of heavy goods vehicles.

It is also known for example from DE 101 46 031 A1 to monitor the inflation pressure of a vehicle wheel by way of an indirect inflation pressure monitoring system. The previously known indirect inflation pressure monitoring systems rely on embedding a deformation sensor in the vehicle tyre and then using the measuring signals from the sensor for sensing and determining the tyre inflation pressure at the time. In the generically related DE 101 46 031 A1, a deformation sensor of the surface wave type is used, designed as a radio sensor and generating a signal corresponding to the respective deformation of the running surface, in particular in the circumferential direction, which is transmitted wirelessly to a signal receiver, which passes it on to an evaluation computer. The evaluation computer in turn uses characteristic maps previously recorded for a prescribed type of tyre, and stored in a map memory, for determining the inflation pressure of a tyre.

BRIEF SUMMARY OF THE INVENTION

A feature of the invention is to provide a system and vehicle wheels that are simplified in comparison with the tyre pressure monitoring system previously used and minimize or avoid the aforementioned disadvantages of the known solutions.

To achieve this feature, it is proposed with regard to a tyre pressure monitoring system comprising at least one indirectly measuring sensor formed by a deformation sensor that this deformation sensor is fitted on the wheel body of the vehicle wheel, and not on the tyre, and can be used for sensing inflation-pressure-dependent deformations of the wheel body. Consequently, inflation-pressure-dependent deformations of the wheel body are sensed by the deformation sensor and used as a measuring or sensor signal for the determination of the tyre inflation pressure and evaluated. Studies carried out by the applicant have shown that, inflating a pneumatic-tyred vehicle wheel in the wheel body, to be specific mostly in the wheel rim, causes deformations that correlate with the inflation pressure in the tyre of the vehicle wheel. This correlation between the inflation pressure in a pneumatic-tyred vehicle wheel on the one hand and the deformations of the wheel body caused by the tyre pressure prevailing on the other hand can therefore be used for the indirect measurement or determination of the inflation pressure, the characteristics of the correlation allowing the measured deformation to be evaluated as a qualitative measure and also as a quantitative measure of the tyre pressure.

In the case of a tyre pressure monitoring system, the evaluation device for determining the inflation pressure may in particular be a component part of the electronic system of the vehicle. It is also advantageous if the tyre pressure monitoring system uses an inductive energy supply of the deformation sensor and/or of the transmission device for the measuring signals of the deformation sensor assigned to the wheel body.

In the case of a vehicle wheel that is suitable for a system according to the invention, a deformation sensor for sensing inflation-pressure-dependent deformations of the wheel body of a pneumatic-tyred vehicle wheel is fitted on the wheel body. The deformation sensor is evaluated in the fitted state of the tyred vehicle wheel on the axle of a vehicle. With the deformation sensor, the inflation pressure of an emergency or spare wheel that is possibly not fitted but only taken along with the vehicle could also be monitored. It is particularly advantageous both for the tyre pressure monitoring system and for the vehicle wheel if the deformation sensor is fitted on the rim part of the wheel body, since the inflation-pressure-induced deformations in the wheel body occur primarily in the wheel rim. It is particularly preferred in this respect if the deformation sensor is attached to the radial outer side of the rim part. In particular a favourable position for attaching the deformation sensor is where the rim part has radii or radii transitions. In a particularly preferred configuration, the rim part of the wheel body is provided with a well and the deformation sensor is fitted on the rim part in the region of the well. In the case of this configuration, it is particularly favourable if the deformation sensor is arranged in a transition radius between a well base and a well flank.

The deformation sensor or sensors is/are preferably attached to the wheel body parallel to the wheel axis of the vehicle wheel or transversely to the wheel axis at an angle of ±45°, so that they therefore sense the deformations transversely to the running direction of the vehicle wheel.

The deformation sensor or sensors is/are preferably attached to the wheel body fixedly, in particular undetachably, preferably on or at the surface of the rim. This solution is advantageous in particular in the case of the preferred application area, that is light-alloy wheels and steel wheels or hybrid vehicle wheels comprising a steel rim and a light-alloy disc.

In order to limit the requirements for the evaluation electronics, the output signals of a single deformation sensor may be used for measuring the inflation pressure. The system or the vehicle wheel may, however, also comprise deformation sensors with multiple sensor cells or multiple deformation sensors, which are attached to the wheel body at a distance from one another. Irrespective of whether one deformation sensor or multiple deformation sensors or deformation sensors comprising multiple sensor cells are used, the corresponding deformation sensors may in particular consist of strain gauges (strain gauge sensors) or comprise strain gauges. Corresponding deformation sensors can be fitted without any problem, in particular to the radial outer side on the rim part of the vehicle wheel. By being arranged in the interior space of the tyre, they are then protected to the greatest extent from environmental influences during operational use on the vehicle. Deformation sensors such as for example strain gauge sensors have an extremely low weight, a small overall size, are flexible and can be attached to the wheel body securely and without the risk of becoming unintentionally detached. It is particularly advantageous if the deformation sensor is a component part of an (in particular passive) RFID transponder, in the case of which the sensor measuring cell and the transmission device are an integral component part and at the same time there is no dedicated energy source, but instead the energy required for reading out and transmitting the evaluation signals, preferably by way of an antenna device of the transponder, is generated from the received radio waves of a reading or receiving device connected to the evaluation device. However, active RFID transponders could also be used, correspondingly having a dedicated energy supply. Passive RFID transponders are preferred however.

The system may also be used for monitoring loading, in that the measuring signals of the same deformation sensor, or the measuring signals of a further deformation sensor, are evaluated for monitoring the static wheel load.

The invention also includes a method-related aspect, that is the detection and evaluation of the inflation-pressure-dependent deformation of the wheel body, in particular the wheel rim, in order to make quantitative and/or qualitative monitoring of the tyre pressure possible by way of an indirectly measuring system. For this purpose, the output signals of a deformation sensor fastened to the wheel body are transmitted to an evaluation device and compared with reference values that have previously been determined in a calibrating operation for the vehicle wheel being used. From the signals of the deformation sensor, in particular from the amplitude of the deformation with respect to an average deformation value corresponding to the tyre inflation pressure, the loading state of the vehicle could also be determined.

Other advantages of this invention will become apparent to those skilled in the art from the following detailed description of the preferred embodiments, when read in light of the accompanying drawings.

DETAILED DESCRIPTION OF THE INVENTION

Figure 1:
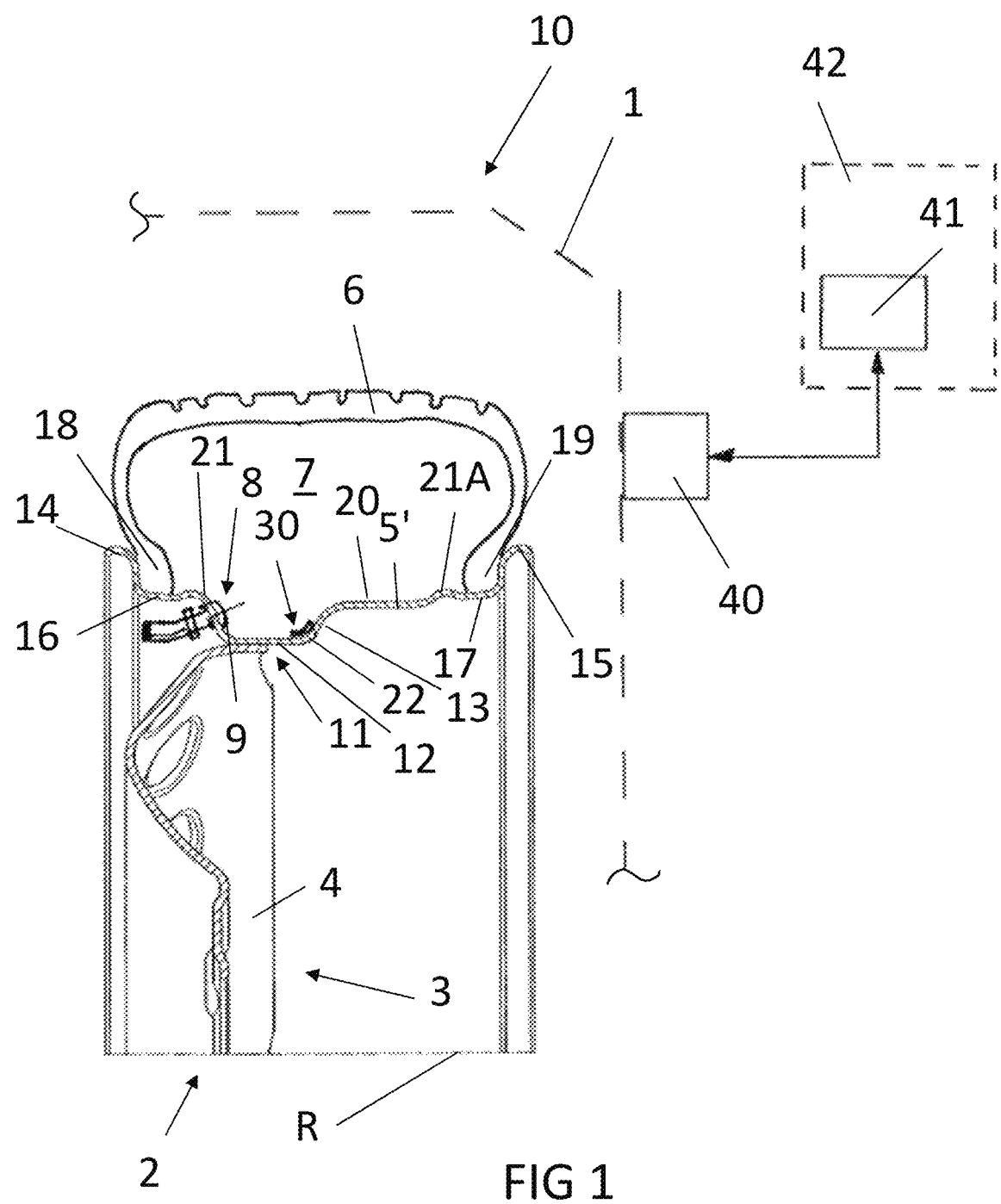
FIG. 1 shows in a schematically greatly simplified form an exemplary embodiment of a tyre pressure monitoring system according to the invention on the basis of a partially represented vehicle wheel and vehicle.

In FIG. 1, a system for monitoring the tyre pressure (tyre pressure monitoring system) that is denoted as a whole by reference numeral 10 is schematically represented in a greatly simplified form. The body of a vehicle 1 in the region of a wheelhouse on the vehicle is indicated by the dashed line. Fastened to the axle (not represented) of the vehicle 1 is the vehicle wheel, which is denoted as a whole by reference numeral 2 and is only half shown here. In the exemplary embodiment represented, the vehicle wheel 2 has a two-part wheel body 3, which in a way known per se comprises a disc part 4 with a central hub connection surface and a rim part 5, which respectively consist of sheet metal, whereby they form a steel vehicle wheel 2. The vehicle wheel 2 could, however, also have a cast wheel body of aluminium, be configured as a hybrid wheel with a rim part of steel and a disc part of aluminium or have some other type of construction. As known to a person skilled in the art, a tyre 6 of any desired suitable type of construction is supported on the radial outer side 5' of the rim part 5, it being possible for the interior space 7 of the tyre to be filled with air by way of the valve 8, whereby the vehicle wheel 2 can be provided with the tyre internal pressure prescribed by the vehicle manufacturer for the respective vehicle load. In the exemplary embodiment shown, the valve 8 is fastened to the outer-wheel well flank 9 of a well 11 in the rim part 5 that is denoted as a whole by reference numeral 11. As known and shown in FIGS. 1 and 2, the rim part 5 also has a well base 12, an inner-wheel well flank 13, two rim flanges 14, 15, two tapered bead seats 16, 17, against which the tyre 6 comes to lie respectively with a tyre bead 18, 19 in a sealing manner, a transitional flange 20, an outer safety bump 21 (or hump) between the outer well flank 9 and the outer tapered bead seat 16 and an inner safety bump 21A between the transitional flange 20 and the inner tapered bead seat 17. The disc part 4 is connected, in particular welded, to the radially inner underside of the well base 12 that lies facing the wheel axis R.

According to the invention, a deformation sensor 30 that is schematically indicated in FIG. 1 is attached to the wheel body 3 of the vehicle wheel 2 in order to detect those deformations that the rim part undergoes with the tyre 6 fitted, on account of the inflation pressure in the interior space 7 of the tyre 6. This deformation sensor 30 is for example a strain gauge, the deformation sensor 30 being positioned here in the transition radius 22 between the well base 12 and the inner well flank 13 and being attached directly to the rim part 5, to be specific on the radial outer side 5' of the rim part 5. The deformation sensor 30 therefore lies in the interior space 7 of the tyre. With the deformation sensor 30, all of the deformations of the wheel rim 5 can be measured and, as still to be explained, evaluated in such a way that the tyre pressure prevailing in the interior space 7 of the tyre can be monitored by the system 10 from the values measured by the deformation sensor 30. For this purpose, the system 10 has in the exemplary embodiment shown a reading or receiving device 40, which is fastened to the vehicle body 1, for example in the region of the wheel suspension or in the wheelhouse, and with which the signals of the deformation sensor 30 can be received. The reading device 40 may at the same time be provided for example with an antenna of a sufficient size in order to accomplish the energy supply for the deformation sensor 30 by inductive means. For this purpose, the deformation sensor 30 could then be configured for example as a passive RFID transponder, which transmits the deformation value at the respective time to the reading device 40. The reading device 40 in turn is coupled in signalling terms to an intelligent evaluation device 41, it being indicated in the exemplary embodiment shown that the evaluation device 41 could also form an integral component part of the vehicle's electronic system 42 that is provided in any case in modern vehicles.

Reference will now be made first of all to the diagrams in FIGS. 4 and 5. In the diagram according to FIG. 4, the correlation between the inflation pressure p (y axis) and the measured value determined with a strain gauge (SG) as a deformation sensor (x axis) is presented for a variously tyred vehicle wheel. The various tyred vehicle wheels are for example a steel vehicle wheel with tyres according to the following specifications

| R1 | 255/70 R16 |
| R2 | 205/70 R16 |
| R3 | 215/60 R16 |
| R4 | 225/55 R16 DSST |
| R5 | 225/55 R16 |
| R6 | 195/55 R16 RFT |
| R7 | 195/50 R16 |

Figure 4:
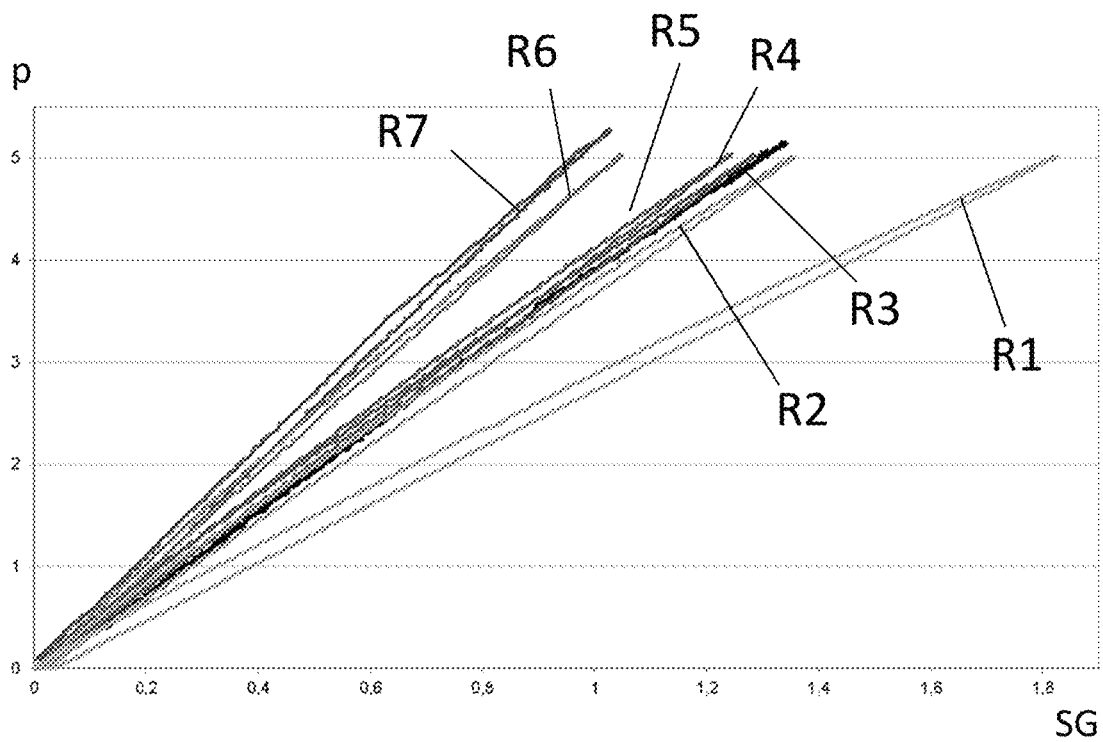
FIG. 4 shows by way of example, on the basis of an illustrative diagram, the correlation between the inflation pressure and deformation of the wheel body for a variously tyred vehicle wheel.
Figure 5:
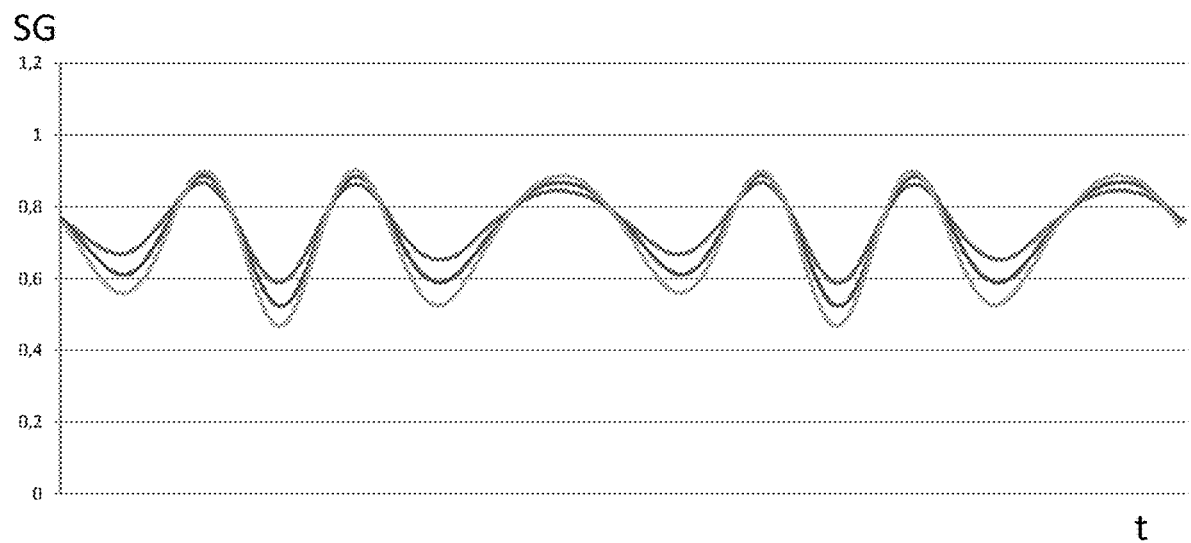
FIG. 5 shows by way of example, on the basis of an illustrative diagram, the signal progression detected by a deformation sensor on a vehicle wheel according to the invention when travelling straight ahead.

It can be seen well from the diagram in FIG. 4 that a change of the inflation pressure p also leads to a significant change of the output signals delivered by the strain gauges, an approximately linear correlation between the existing inflation pressure and the deformation measured at the wheel rim existing here independently of the type of tyre.

When a vehicle is being driven, however, the measured value detected by the deformation sensors 38 also changes in dependence on for example the angle of the deformation sensor in relation to the centre of contact of the vehicle wheel, the properties of the carriageway and the travelling direction of the vehicle (straight-ahead, cornering, etc.). The inflation-pressure-dependently induced measuring signal of the deformation sensor is therefore superimposed by sinusoidal signals from driving operation, as represented by way of example for driving straight-ahead in the diagram that is shown in FIG. 5, the output signals delivered by the deformation sensors 38, here strain gauges, being plotted on the y axis and the time elapsed during a number of revolutions of the wheel being plotted on the x axis in FIG. 5. The three different curves correspond here to signal progressions with different vertical wheel loads. A virtually constant signal progression is obtained, it being evident that the degree of amplitude increases and correlates with an increase in the vertical wheel load. It is also found, however, that an inflation-pressure-dependent average deformation value can be determined from the values determined with a deformation sensor attached to the rim part of the wheel body and can be used to establish changes of the tyre pressure qualitatively and quantitatively with respect to reference values, and thereby used as a base signal for a system for monitoring the tyre pressure. The electronic system of the vehicle possibly requires suitable measurement and sensor dynamics for the sensors. With the system 10 shown in FIG. 1, a deviation of the existing tyre inflation pressure from the optimum or prescribed tyre pressure that allows safe driving and low tyre wear can be established and communicated to the vehicle driver by way of the vehicle's electronic system 42 and suitable indicating devices. It can be seen from FIG. 5 that an average deformation value can be respectively determined loading-dependently, forming a quantitative measure of the tyre pressure existing in the pneumatic tyre fitted.

For this purpose, a signal evaluation could be performed for example in such a way that a relatively great number of values sampled by the deformation sensors for the strain, for example 5000 to 10 000 sampled values, are electronically filtered in order to remove erroneous values on the basis of obvious outliers. For the measured values remaining, the maximum strain and the minimum strain per cycle, i.e. here preferably every 360° turn of the vehicle wheel, are determined. For each cycle, an average strain is determined from half the sum of the respectively measured maximum strain ($\in_{max}$) and minimum strain ($\in_{min}$), that is to say (($\in_{max}$-$\in_{min}$)/2). Furthermore, for each cycle (revolution of the wheel), an amplitude of the strain is also determined from half the difference between the measured maximum strain ($\in_{max}$) and minimum strain ($\in_{min}$), that is to say (($\in_{max}$-$\in_{min}$)/2). These values are also preferably filtered again. If the average strain (corresponding to the assigned inflation pressure) and/or the amplitude of the strain (corresponding to the assigned inflation pressure) then deviate over a prescribed number of cycles, an alarm warning may be issued to the vehicle driver in any way desired.

Strain-changing instances of cornering, driving over potholes, etc., are preferably thereby filtered out, the warnings preferably being indicated in the form of intelligent messages by way of the evaluation electronics. The error messages and indications to the vehicle driver are preferably based on the possible signal sequences and causes. For instance, when the average strain determined is below the prescribed average value by a tolerance value of for example 0.2 bar for the last x cycles, it could be indicated to the vehicle driver that this suggests a loss of inflation pressure, that the tyre pressure should be checked without delay and the system recalibrated. If the average amplitude exceeds the tolerance value by a value z for the last x cycles, it could be indicated to the vehicle driver that the cause of this could be overloading, that the loading should be checked for correctness and the system recalibrated. If, on the other hand, the average amplitude is below the tolerance value by a value z for the last x cycles, the cause could be low loading, for which reason a recalibration of the system could be recommended. If, on the other hand, the average strain exceeds the tolerance value of 0.2 bar with respect to the prescribed average value for the last x cycles, the cause could be overloading or excessive inflation pressure, which could correspondingly be indicated in order to get the vehicle driver to check the inflation pressure and so on and instigate recalibration. The aforementioned indications and tolerance values are only given by way of example and other indications or warnings could also be issued depending on the detection or evaluation.

On the basis of the progression of the output signals determined by the deformation sensors, changing with every type of tyre, it is necessary after fitting a tyre onto a specific wheel body to determine and store a calibrating or reference value, preferably with the correct tyre pressure. This calibrating operation may be performed for example at the workshop when the vehicle wheel is fitted, and possibly also recalibrated at certain points in time, in particular with knowledge of the inflation pressure at the time, possibly also when the vehicle is in operation. With the intelligent evaluation device 41, the measured value recorded at the time by the deformation sensors can be continually compared with the stored reference values, in order to indicate a deviation to the vehicle driver. The indication may take place here in the same way as already performed today in the case of directly measuring tyre pressure monitoring systems.

If the tyre pressure in a vehicle wheel equipped with a corresponding deformation sensor 38 falls, this leads to a lower average strain, in particular in the transition radii such as for example the transition radius 22 between the well base and the well flank. This lower average strain can be filtered out from the driving-dependently determined signal progression and compared with the reference value. If the signal difference then exceeds a prescribed deviation differential, a fault signal is correspondingly output as a warning signal or indicating signal. An excessive tyre pressure may also be detected and indicated to prevent tyre wear.

Figure 2:
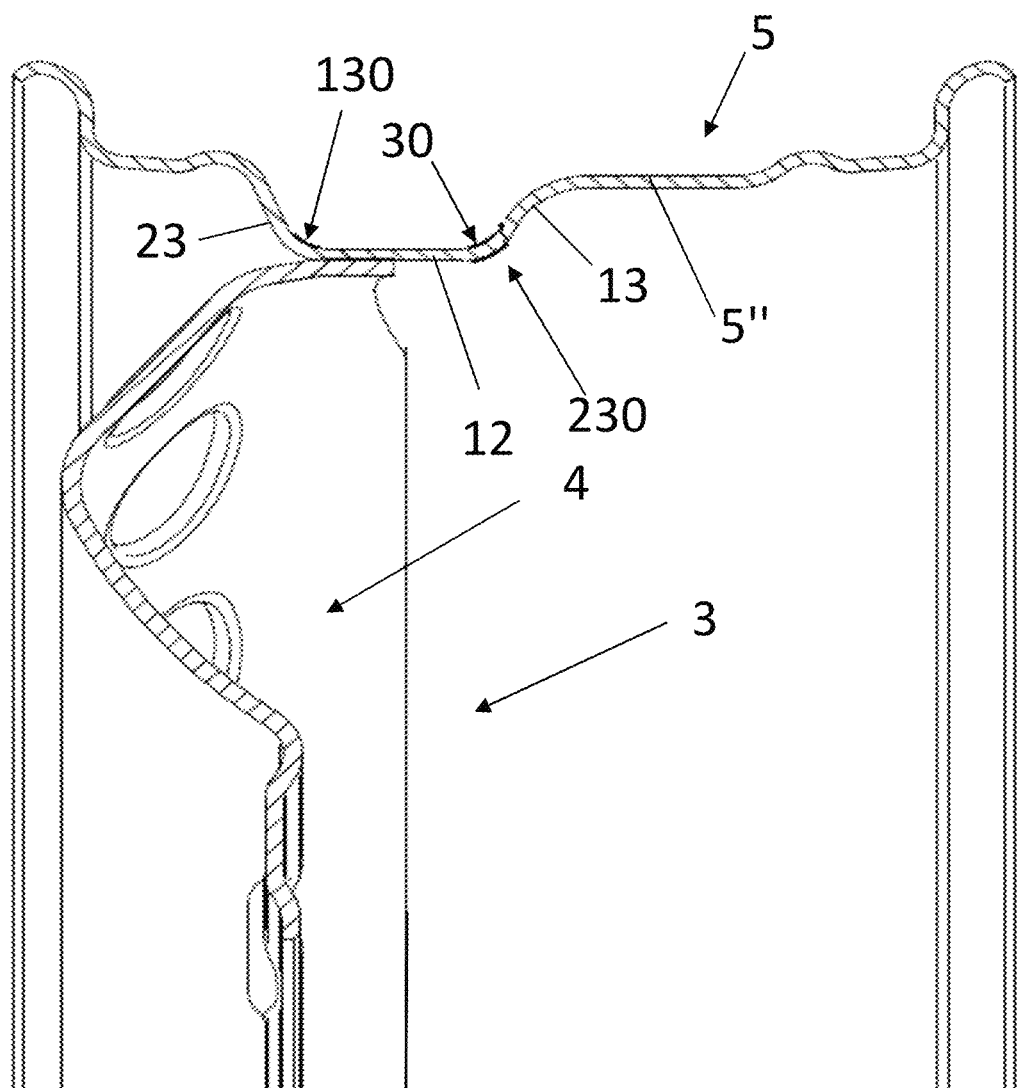
FIG. 2 shows a vehicle wheel in section with alternative attachment positions for a deformation sensor.
Figure 3:
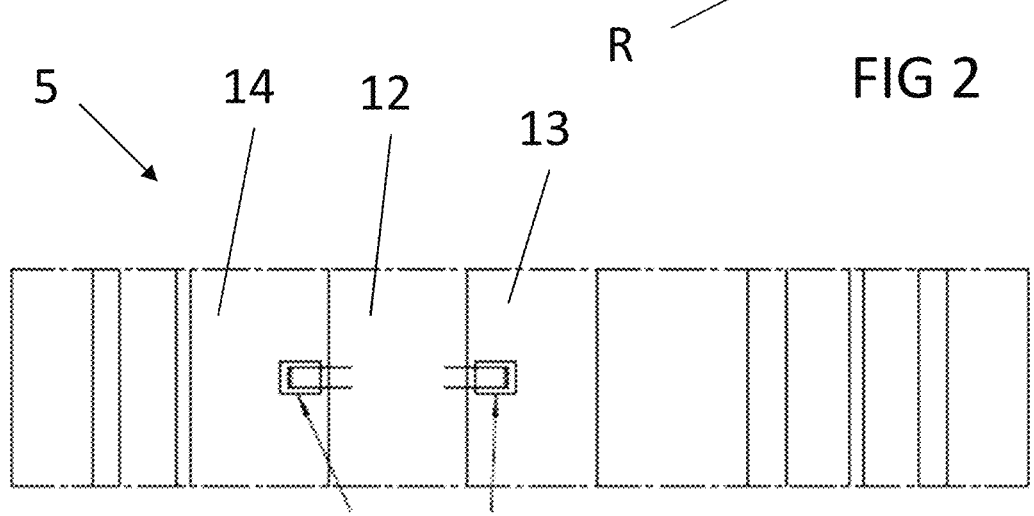
FIG. 3 shows a partial plan view of the vehicle wheel from FIG. 1.

FIGS. 2 and 3 show by way of example different positioning possibilities on the wheel body 3 for corresponding deformation sensors 30, 130 or 230. It can be seen well from FIG. 2 that the deformation sensors 30, 130, 230 are respectively arranged in transition radii. The position of the deformation sensor 30 corresponds to the exemplary embodiment described above. The position of the deformation sensor 130, which likewise lies in the interior space of the tyre, is here the region of the transition radius 23 between the well base 12 and the outer well flank 14, and the position of the deformation sensor 230, though at the transitional flank 22 as in the case of the exemplary embodiment explained further above, here is on the radial inner side 5" of the rim part 5. FIG. 3 illustrates the different positionings for the deformation sensors 30 and 130 again on the basis of a plan view of the rim part 5. FIG. 3 also shows that the deformation sensors 30 and 130 may preferably be arranged parallel to the wheel axis, therefore perpendicularly to the running direction.

For a person skilled in the art, the preceding description gives rise to numerous modifications that are intended to come within the scope of protection of the appended claims. As already explained above, corresponding deformation sensors may be attached both to one-part and to multi-part wheel bodies. The wheel bodies may consist of steel, aluminium, light alloy, fibre-reinforced plastics and the like, or be configured for example in a hybrid type of construction or composite type of construction. It does not matter for the invention whether the rim part and disc part are formed completely or partially separately. The disc part could also be of a multi-part construction and comprise separate spokes. The preferred position for the deformation sensors is respectively on the radial outer side of the rim part in the region of transition radii. If the vehicle wheel does not have a well, or else otherwise, the deformation sensors could also be attached and positioned at other regions, in particular of the rim part. The monitoring system is suitable for vehicle wheels of passenger cars, for vehicle wheels of heavy goods vehicles and other commercial vehicles and also for vehicle wheels of other vehicles, including for example motorcycles. It also goes without saying that preferably every vehicle wheel of a vehicle is equipped with a deformation sensor, which is respectively read separately. An emergency or spare wheel could also be provided with a deformation sensor, in order possibly also to monitor the inflation pressure in the case of a vehicle wheel that is not fitted on the vehicle axle, but only taken along, by means of a reading device assigned to this emergency wheel.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A vehicle wheel configured for use with a system for determining the inflation pressure of a pneumatic tyred vehicle wheel comprising at least one wheel body with a rim part and a disc part, a tyre detachably fitted on the rim part of the wheel body, a valve fitted in the wheel body and configured for changing the inflation pressure in the tyre, at least one sensor, which is separate and distinct from the valve, for indirectly monitoring and sensing the tyre inflation pressure at a time, a data transmission device for transmitting sensor signals of the at least one sensor to an evaluation device for evaluating the sensor signals, the at least one sensor being a deformation sensor, wherein a deformation sensor configured for sensing inflation-pressure-dependent deformations of the wheel body is fitted on the wheel body, and wherein the evaluation device is configured to determine the inflation pressure based on the sensor signals of the deformation sensor, wherein the deformation sensor is attached to a radial outer side of the rim part in a transition radius between a well base and a well flank of the rim part.

2. The vehicle wheel according to claim 1, wherein the evaluation device is a component part of an electronic system of the vehicle.

3. The vehicle wheel according to claim 1, wherein the system uses an inductive energy supply of the deformation sensor and/or of a transmission device.

4. The vehicle wheel according to claim 1, wherein the deformation sensor is attached to the rim part while aligned parallel to a wheel axis or obliquely to the wheel axis at an angle of approximately 45°.

5. The vehicle wheel according to claim 1, wherein the output signals of a single deformation sensor are used for measuring the inflation pressure.

6. The vehicle wheel according to claim 1, wherein the deformation sensor comprises multiple sensor cells, which are attached to the rim part at a distance from one another.

7. The vehicle wheel according to claim 6, wherein the deformation sensor or the sensor cells consist(s) of strain gauges or comprise(s) strain gauges.

8. The system according to claim 1, wherein the deformation sensor is a component part of a passive RFID transponder.

9. A system for determining the inflation pressure of pneumatic-tyred vehicle wheels on vehicles, comprising at least one wheel body with a rim part and a disc part comprising a tyre detachably fitted on the rim part of the wheel body, comprising a valve fitted in the wheel body and configured for changing the inflation pressure in the tyre, comprising at least one sensor for indirectly monitoring and sensing the tyre inflation pressure at the time, comprising a data transmission device for transmitting sensor signals of the at least one sensor, which is separate and distinct from the valve, to an evaluation device for evaluating the sensor signals, the at least one sensor being a deformation sensor, wherein the deformation sensor is fitted on the wheel body and is configured for sensing inflation-pressure-dependent deformations of the wheel body, and wherein the evaluation device is configured to determine the inflation pressure based on the sensor signals of the deformation sensor, wherein the deformation sensor is attached to a radial outer side of the rim part in a transition radius between a well base and a well flank of the rim part.

10. The system according to claim 9, wherein the evaluation device is a component part of an electronic system of the vehicle.

11. The system according to claim 9, wherein the system uses an inductive energy supply of the deformation sensor and/or of a transmission device.

12. The system according to claim 9, wherein the deformation sensor is attached to the rim part while aligned parallel to a wheel axis or obliquely to the wheel axis at an angle of approximately 45°.

13. The system according to claim 9, wherein the output signals of a single deformation sensor are used for measuring the inflation pressure.

14. The system according to claim 9, wherein the deformation sensor comprises multiple sensor cells, which are attached to the rim part at a distance from one another.

15. The system according to claim 14, wherein the deformation sensor or the sensor cells consist(s) of strain gauges or cornprise(s) strain gauges.

16. The system according to claim 9, wherein the deformation sensor is a component part of a passive RFID transponder.

17. The system according to claim 9, wherein a loading state of the vehicle is determinable or is determined from the sensor signals of at least one deformation sensor.

\* \* \* \* \*

UNITED STATES PATENT AND TRADEMARK OFFICE
CERTIFICATE OF CORRECTION

PATENT NO. : 10,752,062 B2
APPLICATION NO. : 15/027871
DATED : August 25, 2020
INVENTOR(S) : Karl Rode, Uwe Gohrbandt and Volker Weber Page 1 of 1

It is certified that error appears in the above-identified patent and that said Letters Patent is hereby corrected as shown below:

In the Claims

Column 10, Claim 15, Line 32, delete "cornprise(s)" and insert --comprise(s)--

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*